US011376666B2

(12) United States Patent
Tripp et al.

(10) Patent No.: US 11,376,666 B2
(45) Date of Patent: Jul. 5, 2022

(54) PIPE FACING MACHINE SYSTEM

(71) Applicant: TRI TOOL INC., Rancho Cordova, CA (US)

(72) Inventors: Justin Tripp, Rancho Cordova, CA (US); Kevin Slattery, Rancho Cordova, CA (US); Ashkan Ferozepurwalla, Rancho Cordova, CA (US); Jason Geiszler, Rancho Cordova, CA (US)

(73) Assignee: TRI TOOL INC., Rancho Cordova, CA (US)

( * ) Notice: Subject to any disclaimer, the term of this patent is extended or adjusted under 35 U.S.C. 154(b) by 21 days.

(21) Appl. No.: 16/168,258

(22) Filed: Oct. 23, 2018

(65) Prior Publication Data
US 2019/0126367 A1 May 2, 2019

Related U.S. Application Data

(60) Provisional application No. 62/578,155, filed on Oct. 27, 2017.

(51) Int. Cl.
*B23B 5/16* (2006.01)
*B23Q 5/08* (2006.01)

(52) U.S. Cl.
CPC .............. *B23B 5/16* (2013.01); *B23B 5/162* (2013.01); *B23B 2215/72* (2013.01);
(Continued)

(58) Field of Classification Search
CPC .......... B23B 5/16; B23B 5/162; B23B 5/163; B23B 3/265; B23B 2215/72; Y10T 82/22; B23Q 9/0007
(Continued)

(56) References Cited

U.S. PATENT DOCUMENTS 253,679 A 2/1882 Bussing
560,322 A 5/1896 Mcgloin
(Continued)

FOREIGN PATENT DOCUMENTS

CN 101852246 A 10/2010
DE 1204497 B 11/1965
(Continued)

OTHER PUBLICATIONS

Fixed Displacement Gear Pumps, Parker (2002).*
(Continued)

*Primary Examiner* — Ryan Rufo
(74) *Attorney, Agent, or Firm* — Workman Nydegger

(57) ABSTRACT

A pipe facing machine (PFM) system includes a PFM and a hydraulic power source having a single hydraulic pump arranged to provide a hydraulic oil flow to the PFM via single hydraulic circuit. The PFM includes a body defining an axis and a cutting head arranged to rotate and translate relative to the axis. Drive systems are arranged to drive clamping of the PFM on a workpiece, rotation of the cutting head about the axis, and translation of the cutting head along the axis. A hydraulic controller includes a plurality of control elements and hydraulically connects the drive systems. The hydraulic controller is arranged to direct and regulate hydraulic oil flow between the drive systems and the hydraulic controller based on signals from the control elements and a computer control system.

5 Claims, 10 Drawing Sheets

(52) U.S. Cl.
CPC .......... *B23B 2270/025* (2013.01); *B23Q 5/08* (2013.01); *B23Q 2705/12* (2013.01)

(58) Field of Classification Search
USPC .......................................................... 60/422
See application file for complete search history.

(56) References Cited

U.S. PATENT DOCUMENTS

| | | | |
|---|---|---|---|
| 575,618 A | 1/1897 | Schon | |
| 640,397 A | 1/1900 | Merker | |
| 667,684 A | 2/1901 | Deharde | |
| 884,996 A | 4/1908 | Westbrook | |
| 1,876,914 A | 9/1932 | Gordon | |
| 2,925,253 A * | 2/1960 | Long | B23Q 5/06 60/468 |
| 3,192,001 A | 6/1965 | Karge, Jr. | |
| 3,733,939 A * | 5/1973 | Paysinger | B23B 5/162 82/113 |
| 3,795,429 A | 3/1974 | Peyrot | |
| 3,970,108 A * | 7/1976 | Ailshie | F15B 13/08 137/596.13 |
| 4,126,065 A | 11/1978 | Clavin | |
| 4,186,630 A | 2/1980 | Lindhag | |
| 4,189,268 A * | 2/1980 | Hackman | B23C 1/20 114/222 |
| 4,411,178 A * | 10/1983 | Wachs | B23B 5/162 82/113 |
| 4,418,591 A | 12/1983 | Astle | |
| 4,452,110 A * | 6/1984 | Emmerson | B23B 5/162 408/130 |
| 4,470,260 A * | 9/1984 | Miller | B62D 5/07 60/422 |
| 4,543,861 A | 10/1985 | Kwech et al. | |
| 4,596,090 A * | 6/1986 | Gundy | B24B 19/02 451/51 |
| 4,624,052 A | 11/1986 | Garcia et al. | |
| 4,677,884 A | 7/1987 | Kwech et al. | |
| 4,739,617 A * | 4/1988 | Kreth | F15B 21/08 60/426 |
| 4,739,685 A | 4/1988 | Ricci | |
| 4,754,672 A | 7/1988 | Vanderpol | |
| 4,767,109 A | 8/1988 | Raketich | |
| 4,770,074 A | 9/1988 | Kwech | |
| 4,819,526 A * | 4/1989 | Geise | B23B 5/168 408/211 |
| 4,939,964 A | 7/1990 | Ricci | |
| 4,944,205 A | 7/1990 | Ricci | |
| 4,979,356 A | 12/1990 | Vatne | |
| 5,025,625 A * | 6/1991 | Morikawa | E02F 3/42 137/596 |
| 5,039,254 A | 8/1991 | Piercy | |
| 5,054,369 A * | 10/1991 | Wardle | G05B 19/46 91/361 |
| 5,086,613 A | 2/1992 | Fox et al. | |
| 5,088,383 A * | 2/1992 | Wardle | F15B 13/07 137/83 |
| 5,127,291 A | 7/1992 | Lothammer | |
| 5,222,426 A * | 6/1993 | Marcon | F15B 11/163 60/420 |
| 5,319,933 A * | 6/1994 | Omberg | F15B 11/165 91/518 |
| 5,368,399 A | 11/1994 | Tremblay | |
| 5,429,021 A | 7/1995 | Astle et al. | |
| 5,518,346 A * | 5/1996 | Geise | B23C 5/2213 408/1 R |
| 5,549,024 A | 8/1996 | Ricci | |
| 5,579,642 A * | 12/1996 | Wilke | F15B 11/168 91/518 |
| 5,605,083 A | 2/1997 | Lupke et al. | |
| 5,699,665 A * | 12/1997 | Coolidge | E02F 9/2225 60/426 |
| 5,878,615 A | 3/1999 | Brown | |
| 5,896,943 A * | 4/1999 | Christensen | B62D 5/07 180/442 |
| 5,943,927 A | 8/1999 | Hanson et al. | |
| 5,950,429 A * | 9/1999 | Hamkins | F15B 11/162 60/422 |
| 6,220,130 B1 * | 4/2001 | Beakley | B23B 5/162 82/113 |
| 6,241,432 B1 * | 6/2001 | Sasanecki | B23Q 11/1084 137/884 |
| 6,257,110 B1 | 7/2001 | Ricci et al. | |
| 6,615,696 B2 | 9/2003 | Ricci et al. | |
| 6,976,357 B1 * | 12/2005 | Pfaff | E02F 9/2228 60/422 |
| 7,222,484 B1 * | 5/2007 | Dornbach | B66F 9/22 60/422 |
| 7,320,268 B2 | 1/2008 | Kawashima | |
| 7,770,596 B2 * | 8/2010 | Christensen | E02F 9/2267 137/596 |
| 7,967,511 B2 | 6/2011 | Aida | |
| 8,051,753 B2 | 11/2011 | Ricci et al. | |
| 8,250,953 B2 | 8/2012 | Hall et al. | |
| 8,763,388 B2 * | 7/2014 | Payne | F15B 11/044 60/466 |
| 8,899,034 B2 * | 12/2014 | Ballweg | F15B 11/162 60/424 |
| 8,997,611 B1 | 4/2015 | Walton et al. | |
| 10,557,484 B2 * | 2/2020 | Kuromusha | F15B 11/16 |
| 2002/0053267 A1 * | 5/2002 | Zanin | B23B 5/162 82/113 |
| 2005/0132851 A1 | 6/2005 | Place | |
| 2010/0162860 A1 | 7/2010 | Hall et al. | |
| 2011/0219920 A1 | 9/2011 | Arnemann | |
| 2011/0314978 A1 | 12/2011 | Phillips, II et al. | |
| 2012/0067180 A1 * | 3/2012 | Lier | B23B 5/162 82/113 |
| 2013/0014937 A1 | 1/2013 | Krohn et al. | |
| 2015/0139809 A1 | 5/2015 | Schroppel | |
| 2016/0121406 A1 | 5/2016 | Weinberg | |
| 2016/0279718 A1 * | 9/2016 | Capriotti | B23C 9/00 |
| 2020/0080286 A1 * | 3/2020 | Caldwell | E02F 9/2246 |

FOREIGN PATENT DOCUMENTS

| | | |
|---|---|---|
| DE | 1966974 U | 8/1967 |
| DE | 10327641 A1 | 1/2005 |
| DE | 102012002203 A1 | 8/2013 |
| EP | 0860228 A1 | 8/1998 |
| EP | 1741940 A1 | 1/2007 |
| JP | S5639318 A | 4/1981 |
| JP | S5964201 A | 4/1984 |
| JP | H02503173 A | 10/1990 |
| JP | 2009127647 A | 6/2009 |
| JP | 2013029116 A | 2/2013 |
| WO | 8807424 A1 | 10/1988 |
| WO | 2008006067 A2 | 1/2008 |
| WO | 2008052106 A2 | 5/2008 |
| WO | WO-2018215446 A1 * | 11/2018 ............... B23B 3/26 |

OTHER PUBLICATIONS

International Search Report and Written Opinion from PCT Application No. PCT/US2018/057038, dated Feb. 21, 2019, 12 Pages.

International Search Report and Written Opinion from corresponding International PCT Application No. PCT/US2014/060912, dated Dec. 22, 2014.

International Search Report and Written Opinion from corresponding International PCT Application No. PCT/US2014/059875, dated Jan. 8, 2015.

Japanese Office Action from JP Application No. 2016-522046, dated Apr. 18, 2017.

Chinese Office Action from CN Application No. 201480055992.6, dated Jun. 6, 2017.

Japanese Office Action From JP Application No. 2016-524029, dated May 30, 2017.

(56) References Cited

OTHER PUBLICATIONS

International Search Report from PCT Application No. PCT/US2017/027868, dated Sep. 22, 2017.

* cited by examiner

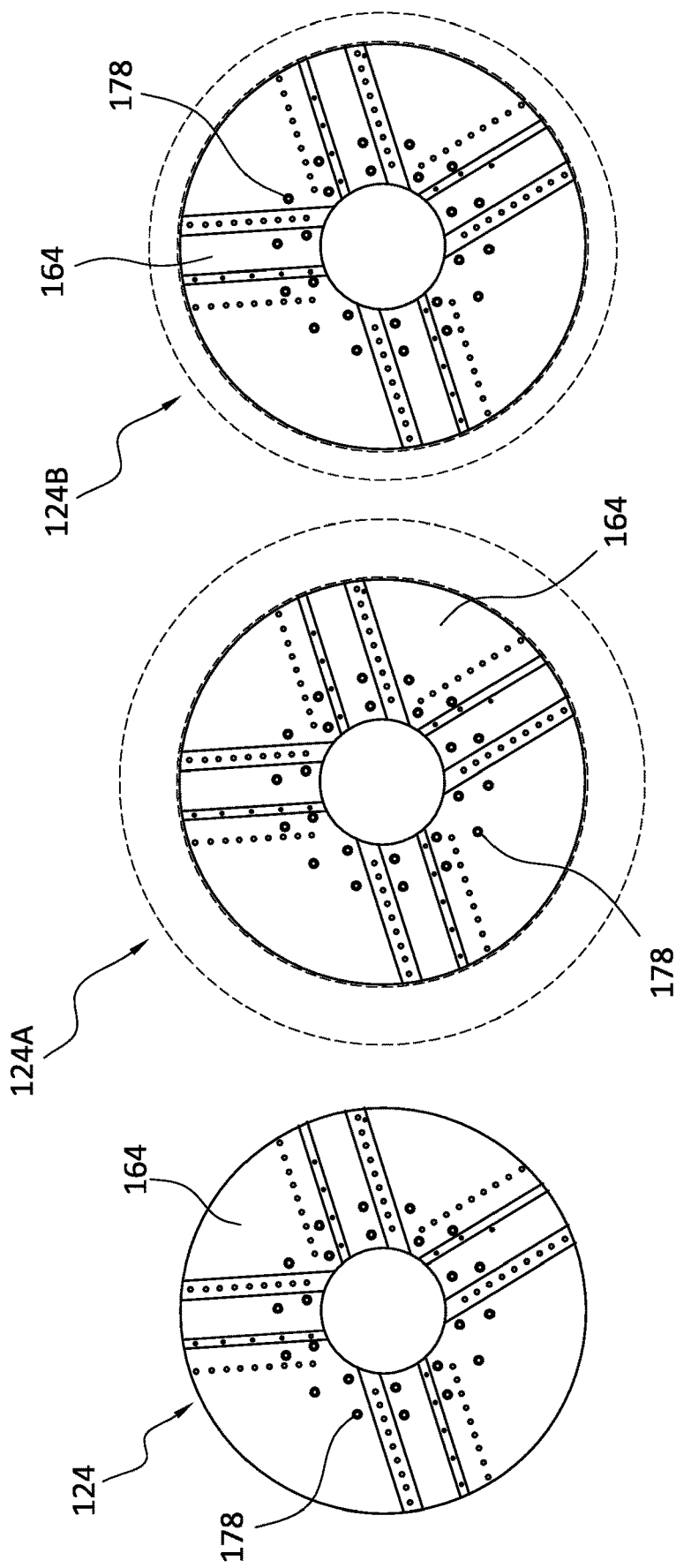

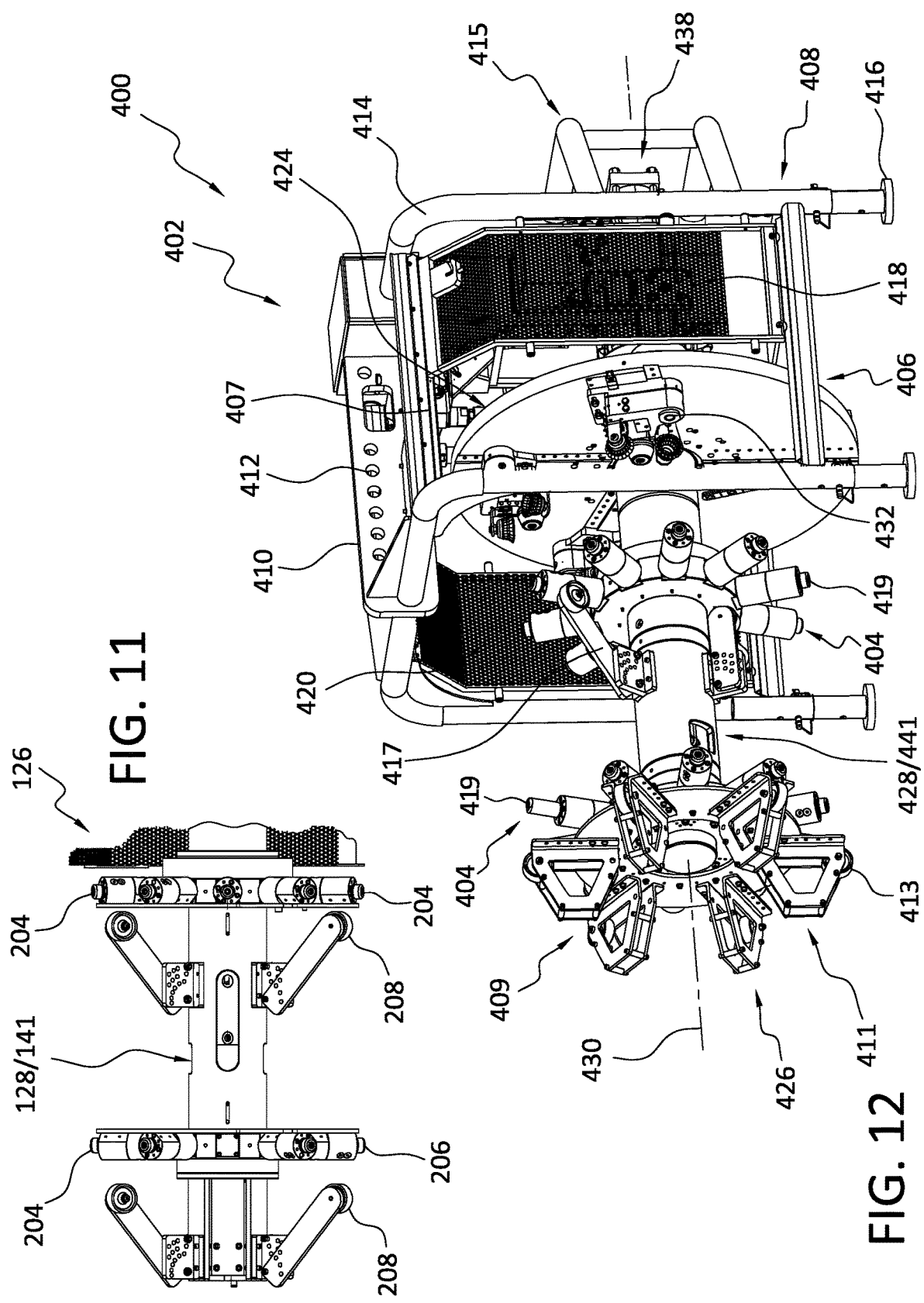

PIPE FACING MACHINE SYSTEM

TECHNICAL FIELD

The disclosure relates to pipe facing machine systems for preparing the end surface of a pipe or tube and/or counterboring in a field environment.

BACKGROUND

In many applications it is necessary to prepare the end surface of a pipe or tube. For example, pipe sections are often joined together by welding and, as such, the end surface of each pipe section must be properly prepared.

In relation to the preparation of the end surface of pipe sections, pipe facing machine (PFM) systems are commonly used in a field environment (e.g., land-based, off-shore, etc.) where access and resources may be limited. Generally, conventional PFM systems include a rotary cutting head carrying a cutting tool that is placed adjacent to the end of a pipe, rotated about the pipe, and advanced with the tool position and/or shape providing the desired configuration of the cut made in the end surface of the pipe.

Safety and operational control requirements for both rotation and advancement of the cutting head have resulted in PFM systems utilizing increased numbers of systems, components, maintenance requirements, repairs, and overall size and weight. Disadvantageously, this makes conventional PFM systems more expensive, complex, and challenging to move and operate in field environments.

BRIEF DESCRIPTION OF THE DRAWINGS

These and other features, aspects, and advantages of the present disclosure will become better understood regarding the following description, appended claims, and accompanying drawings.

FIG. 10A shows a front view of the cutting head of FIG. 1.

FIG. 10B shows a front view of a cutting head according to another embodiment.

FIG. 10C shows a front view of a cutting head according to another embodiment.

FIG. 11 shows a partial side view of the mandrel assembly of FIG. 1.

FIG. 12 shows a PFM system according to another embodiment.

SUMMARY

Figure 1:
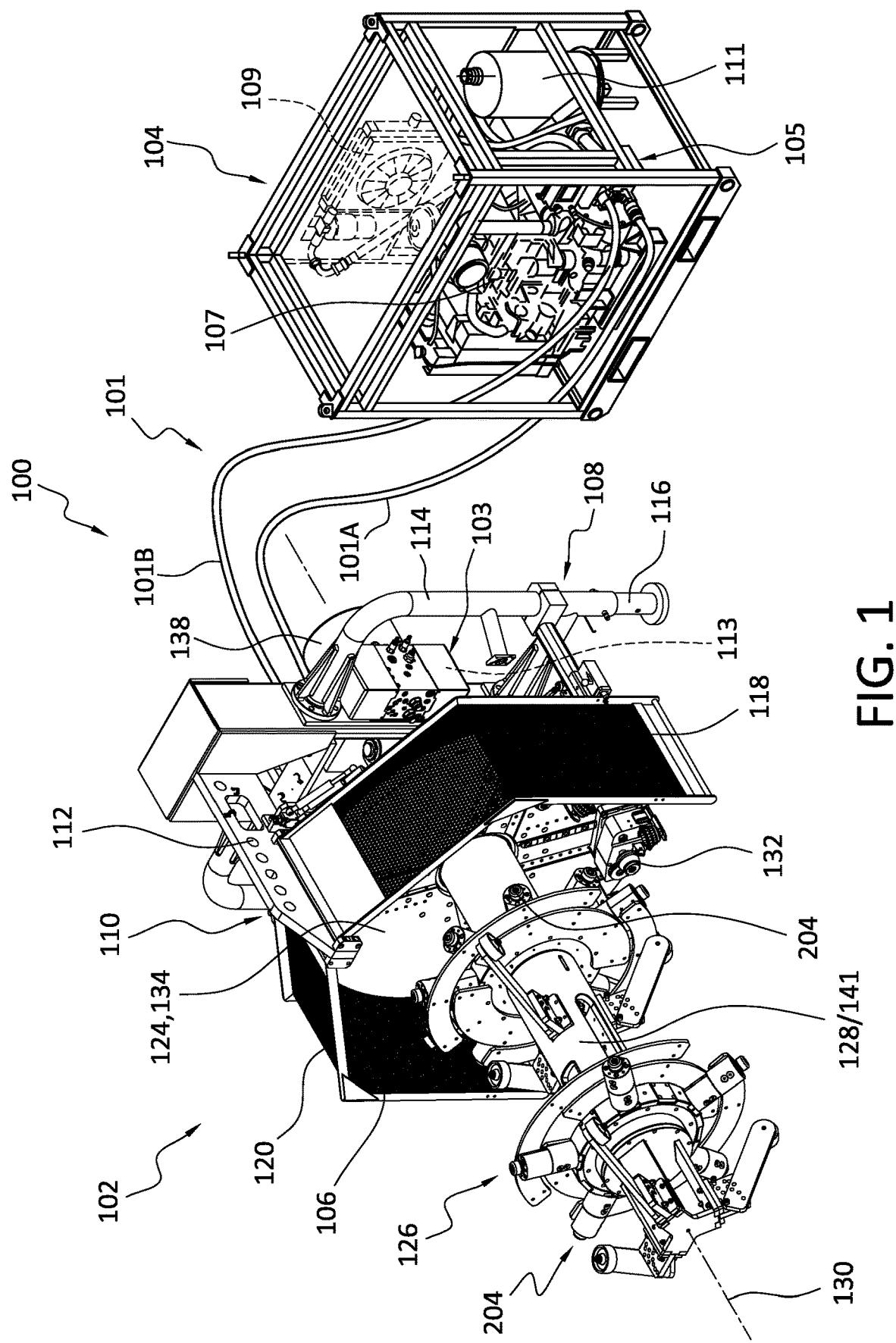
FIG. 1 shows a pipe facing machine ("PFM") system according to an embodiment.

In PFM system embodiments of the present disclosure, a single hydraulic circuit is formed by a single hydraulic pump between a PFM and a hydraulic power unit to drive at least rotation of a cutting head of the PFM, feed of the cutting head, and clamping of the PFM to a pipe or work-piece.

This single hydraulic circuit helps avoid problems that can result from having multiple pumps and hydraulic circuits connecting a hydraulic power unit and PFM. For instance, known PFMs are powered by hydraulic power units including at least two hydraulic pumps. A primary high-flow pump provides oil to rotate the PFM's cutting head and gives the required torque needed to machine or bevel a pipe. A secondary low-flow pump provides oil for all the PFMs auxiliary functions like clamping, rapid feed, slow feed, and rotation jog. Having two pumps requires three or four hydraulic hoses to connect the PFM to the hydraulic power unit and two pressure hoses and one or two return hoses back to the hydraulic power unit. Such systems have conventionally been implemented to an attempt to minimize the hydraulic functions from interfering with each other. Multiple hydraulic pumps and large numbers of hoses are however expensive to purchase and difficult to move and connect. Further, multiple hydraulic pumps and hoses tend to fail more regularly, require more maintenance, and be more sensitive to field conditions, making conventional PFM systems less reliable, and less suitable for operation in field environments. In addition, controlling hydraulic functions with different hydraulic pumps can create safety hazards.

Embodiments of the present disclosure can thus advantageously allow for more reliable and affordable pipe machining operations in a field environment. Furthermore, both machining functions and auxiliary functions can be accomplished using a single hydraulic pump, substantially decreasing the size, weight, and costs of the PFM system. Moreover, integration of all hydraulic functions via the single hydraulic pump advantageously can help in keeping both the PFM operator and PFM system safe during operation.

According to an embodiment, a pipe facing machine (PFM) system includes a PFM and a hydraulic power source hydraulically connected to the PFM via single hydraulic circuit. The hydraulic power source is arranged to provide a hydraulic oil flow to the PFM using a single hydraulic pump. The PFM includes a body defining an axis and a cutting head arranged to rotate and translate relative to the axis. Drive systems are arranged to drive clamping of the PFM on a workpiece, rotation of the cutting head about the axis, and translation of the cutting head along the axis. A hydraulic controller includes a plurality of control elements and hydraulically connects the drive systems. The hydraulic controller is arranged to direct and regulate hydraulic oil flow between the drive systems and the hydraulic controller based on signals from the control elements and a computer control system associated with the PFM system.

According to a variation, the hydraulic controller is arranged to give one or more hydraulic functions of the PFM a priority supply of hydraulic oil over other hydraulic functions. For instance, hydraulic functions of the PFM system can be separated into priority functions and non-priority functions. The priority functions may include a clamping function in which a clamping drive system drives clamping of the PFM on a workpiece, a feed function in which a linear drive system drives translation or movement of the cutting head along the axis, and a jog rotate function in which the rotary drive system drives limited or slow rotation of the cutting head for positioning. The non-priority hydraulic functions may include a drive function in which the rotary drive system drives rotation of cutting head for machining or cutting a workpiece.

When one or more of the priority hydraulic functions (e.g., the clamping function) are activated and/or doing some work, the hydraulic controller can help direct a required or priority hydraulic oil flow to the priority hydraulic functions. The hydraulic controller then directs the remaining or leftover hydraulic oil flow, either to perform the non-priority hydraulic functions (e.g., the drive function), or to return to the hydraulic power source. Such prioritization of the hydraulic oil by the hydraulic controller advantageously helps ensure that the PFM is properly and securely positioned on a workpiece before and during cutting and machining operations, substantially increasing the safety of the PFM system and the operator.

According to a variation, the control elements include a main pressure relief valve that is arranged to return all the hydraulic oil flow to the hydraulic power source when a selected maximum pressure is reached within the PFM. This helps protect the PFM from pressure spikes and the single hydraulic pump. It also can help the PFM operate with different hydraulic power sources having minimum performance specifications.

DETAILED DESCRIPTION OF VARIOUS EMBODIMENTS

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. It should be understood, however, that there is no intention to limit the disclosure to the specific embodiments disclosed, but on the contrary, the intention covers all modifications, alternative constructions, combinations, and equivalents falling within the spirit and scope of the disclosure.

It will be understood that unless a term is expressly defined in this application to possess a described meaning, there is no intent to limit the meaning of such term, either expressly or indirectly, beyond its plain or ordinary meaning. Any element in a claim that does not explicitly state "means for" performing a specified function, or "step for" performing a specific function is not to be interpreted as a "means" or "step" clause as specified in 35 U.S.C. § 112(f).

FIG. 1 illustrates a PFM system 100 according to an embodiment including a PFM 102 and hydraulic power unit 104 arranged to provide hydraulic power to the PFM 102. The PFM 102 can include a body 106 and a frame structure 108 arranged to support and protect the body 106. Chip guards 118, 120 can be mounted on a lower portion of the frame structure on opposite sides of a cutting head described below. The chip guards 118, 120 are movable between a closed position in which the chip guards 118, 120 limit or prevent stray debris or chips from flying away from a workpiece (e.g., a pipe or tube) and the cutting head and toward an operator, and an open position. As discussed above, the chip guards 118, 120 include at least one safety or auto shut-off feature that disables cutting operations and/or rotation of the cutting head of the PFM 102 when the chip guards 118, 120 are in the open position. This has the effect of preventing machining or beveling on a workpiece or pipe without the protection offered by the chip guards 118, 120, which, in turn, improves operator safety.

The body 106 includes a support sleeve 122 (shown in FIG. 7), a cutting head 124 rotatably mounted on the support sleeve 122, and a mandrel assembly 126 having a mandrel head 128 arranged to selectively mount the PFM 102 to a workpiece. Referring still to FIG. 1, one or more tool modules 132 can be mounted on a front side 134 of the cutting head 124. At least one of the tool modules 132 is arranged to selectively mount different tool bits for beveling, facing, and/or counter-boring an end surface of a workpiece. In an embodiment, the tool modules 132 can be arranged to track the inner diameter of a workpiece to achieve controlled land thickness. It will be appreciated that the cutting head 124 can include any suitable number of tool modules. In other embodiments, the tool modules can be omitted. For instance, the front side 134 of the cutting head 124 can define one or more cutting features for beveling, facing, and/or counter-boring the end surface of the pipe. When the cutting head 124 is driven in rotation by the rotary drive system, the linear drive system can advance and feed the cutting head 124 toward the workpiece to bevel, face, and/or counter-bore the end surface of the workpiece.

A rotary drive system 186 (shown in FIG. 8) is operably connected to the cutting head 124 and arranged to controllably drive rotation of the cutting head 124 about an axis 130. A linear drive system 138 is operatively connected to the cutting head 124 and arranged to controllably translate the cutting head 124 along the axis 130 toward and away from the workpiece. For instance, the linear drive system 138 can feed the cutting head 124 into the workpiece. A clamping drive system 141 is operatively connected to the mandrel assembly 126 and arranged to radially expand and contract clamping sections 204 of the mandrel assembly 126 to mount and release the PFM 102 from an inner diameter of the workpiece.

Figure 2:
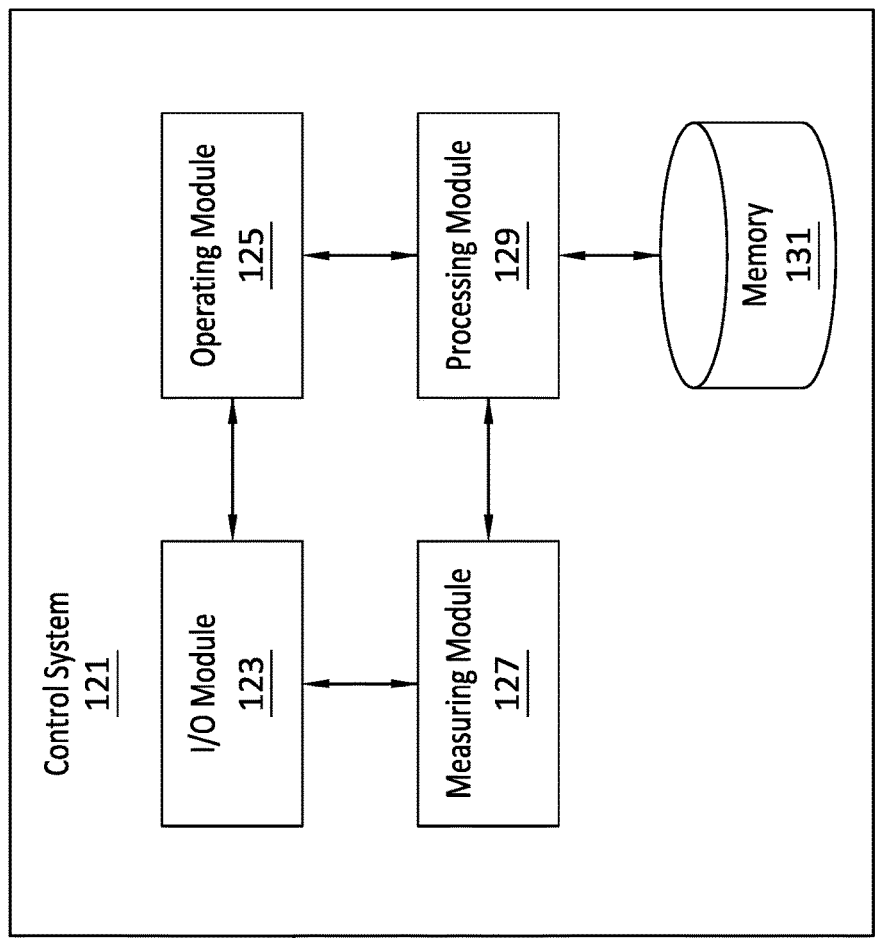
FIG. 2 shows a cutaway view of the hydraulic integrated circuit of FIG. 1.

Referring to FIGS. 1 and 2, the HPU 104 supplies hydraulic oil to the PFM 102 for selectively driving operation of the rotary drive system 186, the linear drive system 138, and/or the clamping drive system 141. More particularly, the HPU 104 supplies hydraulic oil to a hydraulic controller 103 comprising a manifold 117 on the PFM 102 that hydraulically interconnects the rotary drive system 186, the linear drive system 138, and the clamping drive system 141. The hydraulic controller 103 is adapted to direct and regulate fluid flow between the HPU 104, the drive systems 138, 141, 186, and optionally other components in the PFM 102. The hydraulic controller 103 can comprise a hydraulic integrated circuit. The manifold 117 can be formed of aluminum or any other suitable material.

The hydraulic controller 103 includes a plurality of control elements 113 that communicate with and/or are controllable by a computer control system 121 (shown in FIG. 3) to direct and regulate the hydraulic oil flow within the PFM system 100, which, in turn, controllably drives operation of the rotary drive system 186, the linear drive system 138, and the clamping drive system 141. In an embodiment, the control elements 113 can include measuring devices, pressure sensors, control valves, check valves, pressure relief valves, proportional pressure relief valves, sequence valves, pressure reducing valves, flow dividing valves, flow control valves, pressure switches, solenoid valves, flow reducers, and/or any other suitable hydraulic control.

The control elements 113 can be located within a housing however it will be appreciated that the control elements 113 can be at any suitable location within the PFM system 100. In an embodiment, the control elements 113 can include a plurality of solenoid valves 115 mounted on the manifold 117 as shown in FIG. 2. The solenoid valves 115 can be activated electronically and/or mechanically to offer fast operation, high reliability, long service life, and compact design. One or more of the solenoid valves 115 can include a head portion that is manually adjustable to adjust flow through the valves and may include two or more ports. According to a variation, eight solenoid valves 115 can be mounted on the manifold 117 and as few as ten hoses fluidly connect the hydraulic controller 103 to the drive systems (e.g., rotary drive system 186, the linear drive system 138, and the clamping drive system 141).

In an embodiment, the hydraulic controller 103 can include at least one high-pressure line (in-coming line), at least one low pressure tank return line, one or more load-sense logic lines, and at least one priority logic valve. The hydraulic controller 103 is arranged to help direct and prioritize hydraulic flow within the PFM system 100, which, in turn, can control operation of the rotary drive system 186, the linear drive system 138, and/or the clamping drive system 141. In other words, the hydraulic controller 103 can give one or more hydraulic functions a priority supply of hydraulic oil over other hydraulic functions. For instance, hydraulic functions of the PFM system 100 can be separated into priority functions and non-priority functions. The priority functions can include a clamping function in which the clamping drive system 141 drives a clamping of the mandrel head 128 on a workpiece, a feed function in which the linear drive system 138 drives translation or movement of the cutting head 124 along the axis 130, and a jog rotate function in which the rotary drive system 186 drives limited or slow rotation of the cutting head 124 for positioning the tool modules 132. The non-priority hydraulic functions can include a drive function in which the rotary drive system 186 drives rotation of cutting head 124 for machining or cutting a workpiece.

The hydraulic controller 103 can receive a hydraulic oil flow A (shown in FIG. 4) from a pump of the HPU 104. When one or more of the priority hydraulic functions are activated and/or doing some work, the hydraulic controller 103 can help direct a required or priority hydraulic oil flow B (shown in FIG. 4) to the priority hydraulic functions. The priority hydraulic oil flow B is preferably about 4 gallons per minute (gpm) but can be any suitable flow rate. The hydraulic oil flow A from the HPU 104 to the hydraulic controller 103 can be between about 40 gpm and about 70 gpm (e.g., about 53 gpm), between about 45 gpm and about 65 gpm, or between about 50 gpm and about 60 gpm. In other embodiments, the priority hydraulic oil flow B and/or the hydraulic oil flow A can be higher or lower.

According to a variation, the PFM system 100 can vary the priority hydraulic oil flow B to and/or between different components of the PFM 102. For example, the hydraulic controller 103 can direct a first flow rate to the linear drive system 138 and the clamping drive system 141 for the clamping function, the jog feed function, and the feed function from the hydraulic oil flow A, and selectively provide a second flow rate to the linear drive system 138 for a slow feed function. In an embodiment, the first flow rate can comprise a priority hydraulic oil flow B comprising between about 3 gpm and about 6 gpm (e.g., about 4 gpm), and the second flow rate can comprise a super-reduced flow rate B1 (shown in FIG. 4) between about 0.004 gpm and 0.026 gpm.

The hydraulic controller 103 then directs the remaining or leftover hydraulic oil flow from the hydraulic oil flow A, either to perform the non-priority hydraulic functions (e.g., the drive function), or to the HPU 104. The leftover hydraulic over flow can comprise non-priority hydraulic oil flow C (shown in FIG. 4) when directed to perform the non-priority hydraulic functions and/or a return hydraulic oil flow D (shown in FIG. 4) when directed to the HPU 104. Such prioritization of the hydraulic oil within the PFM 102 advantageously helps ensure that the PFM 102 is properly and securely positioned on a workpiece before and during cutting and machining operations, substantially increasing the safety of the PFM system 100 and the operator. It will be appreciated that while the prioritization of the hydraulic oil is described in terms of flow rate (e.g., gpm), in other embodiments, the prioritization of the hydraulic oil can be quantified in terms of volume, pressure, or any other suitable measure of the hydraulic oil within the PFM system 100.

The hydraulic controller 103 is arranged to direct and regulate hydraulic oil flow between the drive systems 186, 138, 141 and the hydraulic controller 103 based on signals from the control elements 113 and/or a computer control system described below. In an embodiment, load-sense logic lines and/or the hydraulic controller 103 may function in response to load demands (real-time and/or predetermined) on the rotary drive system 186, the linear drive system 138, and/or the clamping drive system 141. The load-sense logic lines and/or the hydraulic controller 103 can function in response to information received from the computer control system or one or more measuring or sensing devices (e.g., pressure transducers) included in the control elements 113 or operably associated with the rotary drive system 186, the linear drive system 138, and/or the clamping drive system 141. The load-sense logic lines and/or the hydraulic controller 103 may function based on hydraulic signals and/or electrical signals. The hydraulic signals can be associated with hydraulic point or line pressure, hydraulic loads, hydraulic flow rates, hydraulic oil volumes, presence of contaminants, air, or dissolved gases, and/or any other suitable property or characteristic of the hydraulic oil within the PFM system 100.

Because the hydraulic controller 103 provides centralized and prioritized distribution of the hydraulic oil within the PFM 102, a single hydraulic pump 105 on the HPU 104 can supply the hydraulic oil flow from the HPU 104 to the PFM 102 rather than several pumps as required in the prior art. In addition, a single hydraulic circuit 101 formed between the HPU 104 and the PFM 102 supplies the hydraulic oil flow from the HPU 104 to the PFM 102. In an embodiment, the single hydraulic circuit 101 comprises a supply line 101A or supply hose and a return line 101B or return hose.

This is advantageous because the PFM system 100 can operate using a significantly fewer number of hoses and a reduced volume of hydraulic oil than prior art PFM systems. For instance, the PFM 102 can use less than about twenty gallons (e.g., about thirteen gallons) of hydraulic oil or oil and as few as ten hoses to hydraulically control operation of the of the PFM 102, and as few as two hoses to the connect the PFM 102 to the HPU 104. Compare this to conventional PFM systems that can use over a hundred gallons of hydraulic oil and up to a hundred hoses on the PFM and three or four hoses to connect the PFM to the HPU and two pressure hoses and one or two return hoses to the reservoir of the HPU. This complexity of design is problematic because hydraulic pumps and hoses are expensive to purchase and difficult to move and connect. In addition, the higher number of pumps and hoses on a conventional PFM system significantly increases the size and weight the system (including the volume of hydraulic oil), which, in turn, makes the PFM system heavier and more difficult maneuver in a field environment. Further, the increased number of components increases maintenance and repairs, making conventional PFM systems less reliable and more expensive to operate in field environments. The PFM system 100 can thus help avoid many problems that can result from having multiple hydraulic pumps and hydraulic circuits connecting an HPU and a PFM.

Figure 1A:
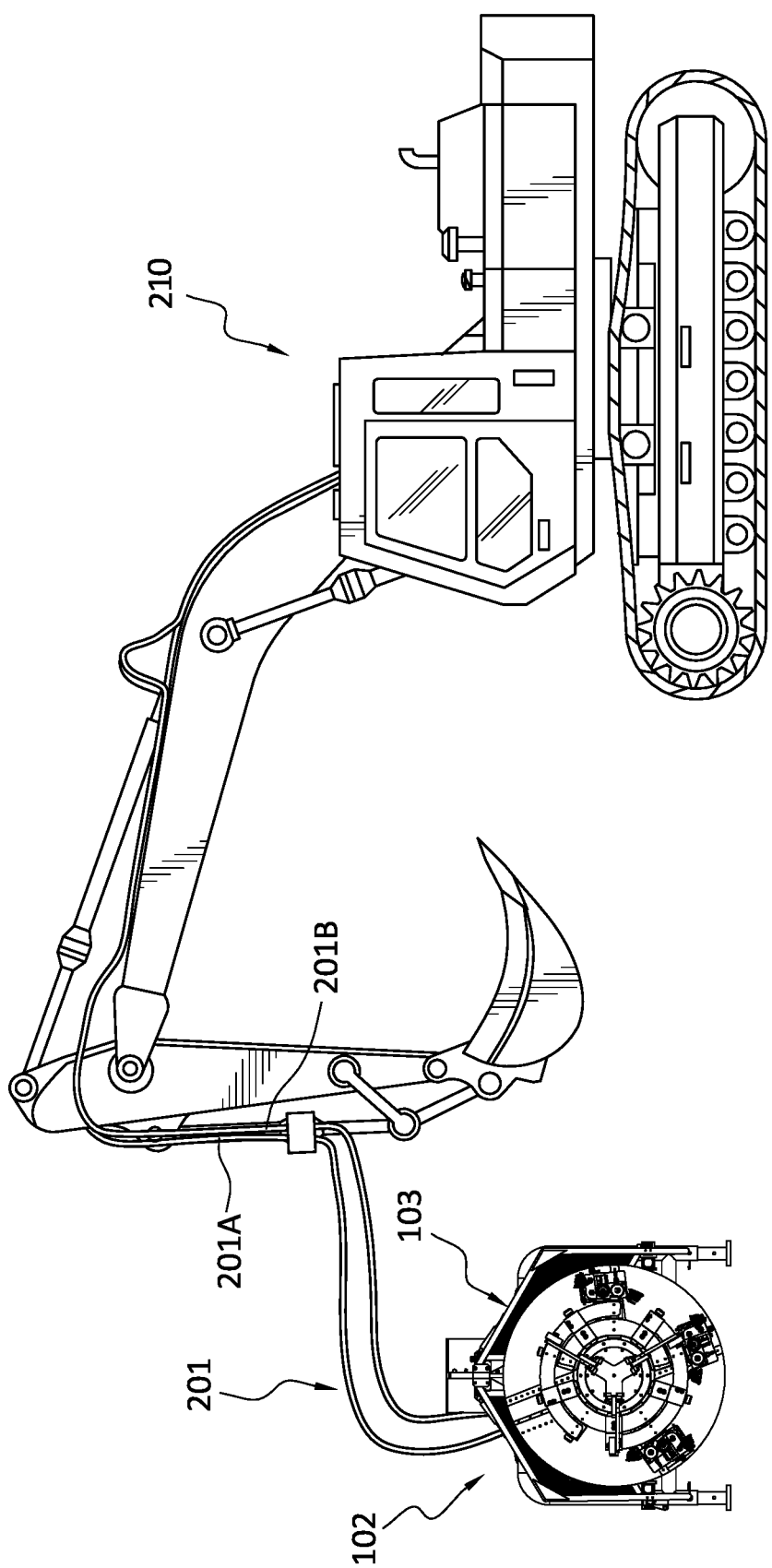
FIG. 1A shows a PFM system according to another embodiment.

The arrangement of the hydraulic controller 103 also allows the PFM 102 to be operably powered using hydraulic power sources other than the HPU 104. For instance, because a single hydraulic circuit can drive operation of the PFM 102 via the hydraulic controller 103, the PFM 102 may be adapted to be powered by auxiliary hydraulic systems commonly found on heavy equipment in field environments (e.g., excavators, loaders, back hoes, cranes). As shown in FIG. 1A, an excavator 210 can power the PFM 102 via a single hydraulic circuit 201 comprising an auxiliary high-pressure line 201A and an auxiliary low-pressure line 201B typically employed on the excavator 210 and connecting the hydraulic controller 103 to the excavator 210. This has the effect of making the PFM 102 more versatile, and productive in different field environments.

Referring again to FIG. 1, the HPU 104 can include the single hydraulic pump 105, a motor 107, a heat exchanger 109, and a reservoir 111. The single hydraulic pump 105 can comprise a single fixed gear pump or any other suitable pump. The motor 107 can comprise a diesel engine or any other suitable motor. The reservoir 111 can be a cyclone hydraulic reservoir arranged to spin hydraulic oil for deaeration of the hydraulic oil. This beneficially allows the size of the reservoir 111 to be substantially reduced compared to the bigger hydraulic tanks typically used for deaeration (e.g., use of 13.2 gallons of hydraulic oil compared to 100 to 140 gallons), reducing space, weight, and cost of the HPU 104. For instance, the reservoir 111 can weigh up to about one-thousand pounds less than known hydraulic tanks and provide thousands of dollars of savings in hydraulic oil. The reservoir 111 is also more environmentally friendly because if a hose were to break there is less hydraulic oil available to contaminate the environment. The heat exchanger 109 can comprise any suitable heat exchange system. While the HPU 104 is shown including a single hydraulic pump, it will be appreciated that the HPU may be adapted to include more than a single hydraulic pump that provides hydraulic oil to the PFM 102 via a single hydraulic circuit.

Figure 3:
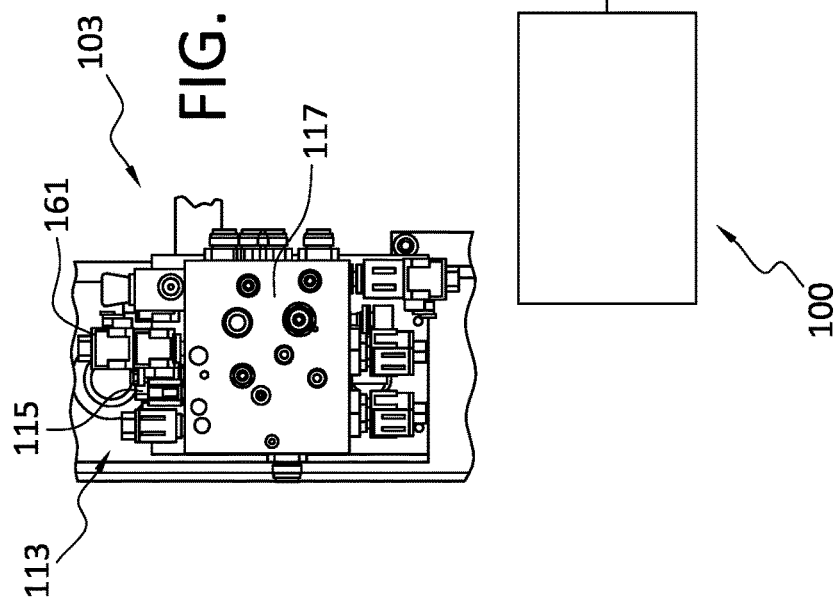
FIG. 3 shows a schematic view of a computer control system according to an embodiment.

In an embodiment, the hydraulic controller 103 is controlled by a computer control system and can help keep both an operator of the PFM system 100 and the PFM system 100 safe during operation. FIG. 3 illustrates a computer control system 121 according to an embodiment. The computer control system 121 of the PFM system 100 can be operable to control operation of one or more of the foregoing system components (e.g., HIC, rotary drive system, linear drive system, clamping drive system, HPU). The computer control system 121 can be internal to or external to the PFM system 100 and/or the hydraulic controller 103. The computer control system 121 may be programmable for regulating and/or directing hydraulic flow and pressure through the PFM system 100, which, in turn, can be applied to mount the PFM system 100 to a workpiece, aligning the PFM system 100 on the workpiece, and/or machining, beveling or counter-boring an end surface of the workpiece.

The computer control system 121 can include an I/O module 123. The I/O module 123 can communicate with the PFM system 100, a user, other modules of the computer control system 121, and/or other computer systems. Through the I/O module 123, an operating module 125 can direct different components of the PFM system 100 to move or actuate. A measurement module 127 can direct one or more measuring devices to measure pressure, flow, force and can receive data from the measuring devices. A processing module 129 can execute computer executable instructions and/or process operational data. Optionally, the processing module 129 may be operably coupled to a memory 131.

The memory 131 can store an application including computer executable instructions, measurement data, flow data, and/or operational data constituting a program to perform certain acts (e.g., a part program, a software control program, etc.). For example, the processing module 129 may be operably coupled to the memory 131 storing an application including computer executable instructions and data constituting a customized program to prioritize distribution of hydraulic oil between the linear drive system 138, the rotary drive system 186, and the clamping drive system 141. The memory 131 may be embodied as a computer readable medium, such as a random access memory ("RAM"), a hard disk drive, or a static storage medium such as a compact disk, DVD, or the like. The memory 131 may further store property data describing properties of a pipe and/or machining operation. The computer control system 121 may further include a display coupled to the I/O module 123. In an embodiment, the computer control system 121 can be integral to a computer system. In other embodiments, the computer control system 121 can be external to a computer system. The computer control system 121 can comprise a microcontroller operatively coupled to the hydraulic controller 103. The microcontroller can include primary and secondary processors that communicate asynchronously with each other.

Optionally, a control panel 153 (shown in FIG. 4) is operably coupled to the computer control system 121. The control panel 153 can include displays and/or controls. For instance, the control panel 153 can include a display for displaying information to an operator or another person. In an embodiment, the display comprises an LCD display showing real time clamp pressure, drive pressure, and safety light indicators for the chip guards 118, 120 and the clamp pressure. The control panel 153 can include an emergency stop control, a jog rotate control for the rotary drive system 186, a jog feed control for the linear drive system 138, a clamping control for the clamping drive system 141, a drive control for the rotary drive system 186, and a feed control (e.g., forward slow and reverse) for the linear drive system 138.

Figure 4:
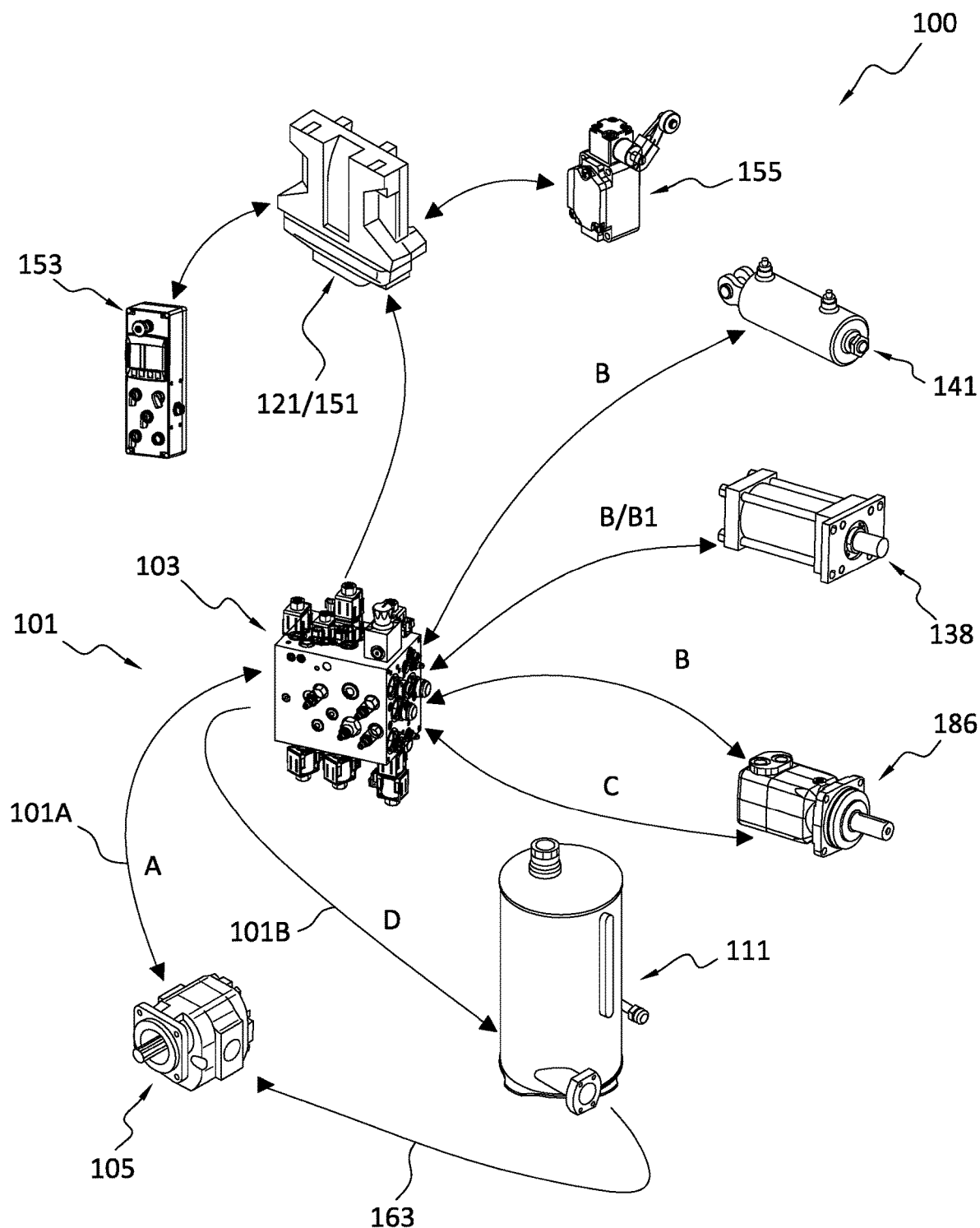
FIG. 4 shows a schematic view of an operational system according to an embodiment.

FIG. 4 shows an operational schematic of the PFM system 100 according to an embodiment. The hydraulic controller 103 is operatively coupled to the computer control system 121, the single hydraulic pump 105, the reservoir 111, the clamping drive system 141, the linear drive system 138, the rotary drive system 186. The hydraulic controller 103 can be electronically coupled to the computer control system 121, which, in turn, is electronically coupled to the control panel 153 and at least one door switch 155 associated with the chip guards 118, 120. In an embodiment, the computer control system 121 can comprise a programmable logic controller (PLC) 151 or a safety-rated PLC adapted for operation in field environments. The PLC can include dual processors with a secondary processor having access to control inputs and supervisory control of outputs.

The hydraulic controller 103 can be hydraulically coupled to the single hydraulic pump 105, the reservoir 111, the clamping drive system 141, the linear drive system 138, and the rotary drive system 186. As seen, the single hydraulic pump 105 and the reservoir 111 can be operatively coupled to the hydraulic controller 103 via the single hydraulic circuit 101 comprising the supply line 101A extending between the single hydraulic pump 105 and the hydraulic controller 103, and the return line 101B extending between the hydraulic controller 103 and the reservoir 111. A suction line 163 can connect a suction side of the single hydraulic pump 105 to the reservoir 111.

The single hydraulic pump 105 can comprise a gear pump or any other suitable pump. The clamping drive system 141 is shown comprising a hydraulic cylinder but can be any suitable drive system. The linear drive system 138 is shown comprising a hydraulic cylinder but can be any suitable drive system. The rotary drive system 186 is shown comprising a hydraulic motor but can be any suitable drive system. As described below, the rotary drive system 186 can comprise dual motors.

Figure 5:
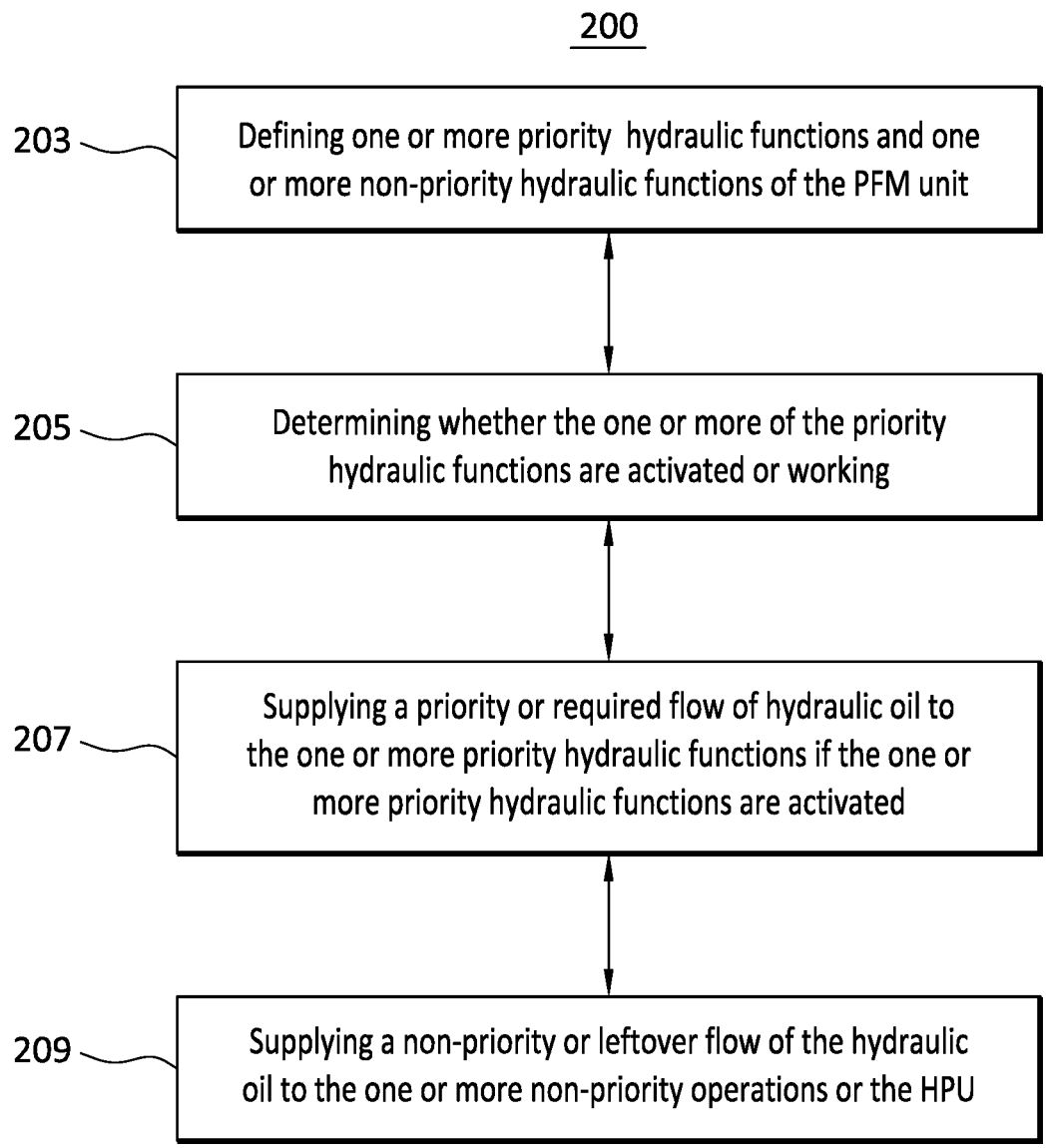
FIG. 5 shows an operational routine of the PFM system of FIG. 1 according to an embodiment.

Referring to FIG. 5, a hydraulic oil prioritization routine or application 200 of the PFM system 100 will now be described according to an embodiment. Step 203 can include defining priority hydraulic functions and non-priority hydraulic functions of the PFM 102. This can include the computer control system 121 and/or the hydraulic controller 103 defining the priority and non-priority operations, or receiving input specifying the priority hydraulic functions and non-priority hydraulic functions. In an embodiment, the priority hydraulic functions can comprise the clamping function, the jog feed function, the jog rotate function, and feed function described above. The non-priority functions can comprise the drive function described above. In other embodiments, the priority hydraulic functions and the non-priority hydraulic functions can include different hydraulic functions. For example, the non-priority functions can comprise the drive function and the feed function.

Step 205 can include determining whether one or more of the priority hydraulic functions are activated or working. This determination can include the computer control system 121 receiving and/or processing information or input from the control panel 153. This determination can include the hydraulic controller 103 and/or the computer control system 121 receiving and/or processing information from one or more measuring or sensing devices (e.g., pressure transducers) included in the control elements 113. This determination can include the hydraulic controller 103 and/or the computer control system 121 receiving and/or processing information from one or more measuring or sensing devices associated with the hydraulic circuits supplying hydraulic oil to the drive systems 186, 138, and/or 141. This determination can include the hydraulic controller 103 and/or the control panel 121 receiving information related to load demands (real-time and/or predetermined) on the drive systems 186, 138, and/or 141. This can include the hydraulic controller 103 receiving a hydraulic load sense logic signal if a priority function is activated and doing some work.

Step 207 can include supplying a priority or required supply of hydraulic oil to the one or more priority functions if the one or more hydraulic functions are activated or working. This can include the hydraulic controller 103 supplying the priority hydraulic oil flow B to the clamping function, the feed function, and the jog rotate operation (each a priority hydraulic function) if any of these operations are activated or working. In an embodiment, the control elements 113 can include a priority logic valve 161 arranged to selectively direct hydraulic oil to the drive systems 186, 138, and/or 141 based on load demands or operational activity. When the HPU 104 is turned on, the single hydraulic pump 105 provides the hydraulic oil flow A to the hydraulic controller 103 via the single hydraulic circuit 101, which, in turn, is directed where to go by the priority logic valve 161. In an embodiment, the single hydraulic pump 105 can supply the input hydraulic oil flow A to the hydraulic controller 103. The input hydraulic oil flow A can be between about 50 gpm and about 55 gpm to the hydraulic controller 103. Optionally, the priority logic valve 161 and a fixed orifice of the hydraulic controller 103 can be adapted to provide the priority hydraulic oil flow B to the priority hydraulic functions with the remaining or leftover hydraulic oil flow C, D going back to the reservoir 111, or the non-priority hydraulic functions.

If the clamping function, the feed function, or the jog rotate function are activated and doing some work, the respective drive system, measuring devices, and/or hydraulic circuits associated with the drive systems can send a hydraulic load sense logic signal back to the hydraulic controller 103 or the priority valve 161. In response to the hydraulic load sense logic signal, the priority logic valve 161 can direct the priority hydraulic oil flow B to the priority hydraulic functions.

Other components of the hydraulic controller 103 can help control the priority hydraulic functions. For instance, the control elements 113 can include a solenoid valve arranged to drive the jog rotate function of the rotary drive system 186. This solenoid valve can help control and direct the priority hydraulic oil flow B to the rotary drive system 186 from the hydraulic controller 103 to slowly rotate the cutting head 124 for positioning the tool modules 132.

The control elements 113 can include a pressure-compensated flow control valve adapted to help the linear drive system 138 move or translate the cutting head 124 rapidly for positioning, or slowly for cutting and machining a workpiece. For instance, the pressure-compensated flow control valve can reduce the priority hydraulic oil flow B directed to the linear drive system 138 for slowly feeding the cutting head 124. In an embodiment, the pressure-compensated flow control valve can reduce the priority hydraulic oil flow B to between about 0.004 gpm and about 0.26 gpm or between about 0.008 gpm and about 0.20 gpm for slow feed.

According to a variation, the control elements 113 include a pressure relief valve, a pilot-operated check valve, and a pressure transducer operatively coupled to the clamping drive system 141. The pressure relief valve can have an adjustable configuration, allowing the clamping pressure to be adjusted for applications where different clamping forces are required. For instance, the pressure relief valve can be adjusted to lower the clamping pressure of the clamping sections 204 for thin wall pipe applications. The pilot-operated check valve can selectively lock hydraulic oil in the extended position of the clamping drive system 141 so that the clamping sections 204 cannot unclamp or retract until the pilot-operated check valve receives a hydraulic signal. In an embodiment, the pressure transducer can generate and provide pressure information to the computer control system 121 so that the computer control system 121 can monitor the clamping pressure of the clamping sections 204. The computer control system 121 can then direct the control panel 153 to display the clamping pressure.

Referring still to FIG. 5, step 209 can include supplying a non-priority or leftover flow of the hydraulic oil to the one or more non-priority hydraulic functions or to the HPU 104. This can include the hydraulic controller 103 directing a return hydraulic oil flow D to the reservoir 111 via a first two-position solenoid valve included with the control elements 113. When the drive control on the control panel 153 is activated or turned to the on position, a tank port on the two-position solenoid valve closes, and a second two-position solenoid valve opens to give a non-priority hydraulic oil flow C to the rotary drive system 186 for cutting or machining operations. In an embodiment, the rotary drive system 186 can be protected from starting roughly by a soft start circuit that is parallel to first and second two-position solenoid valves. The soft start circuit can include a hydraulically piloted proportional flow control valve arranged to return or dump a portion of non-priority hydraulic oil flow C supplied to the rotary drive system 186 back to the reservoir 111 while the drive control is on. Over a selected time-period (e.g., about 1 second), a pulse-width modulation signal can gently or incrementally close the hydraulically piloted proportional flow control valve, giving the rotary drive system 186 a smooth and full non-priority hydraulic oil flow C for machining or cutting operations.

According to a variation, the routine 200 can include the step of returning or looping the input hydraulic oil flow A back to the HPU 104 if the PFM 102 is not activated or working.

Optionally, the PFM system 100 can include a pressure relief valve system arranged to protect the PFM from excess pressure. For instance, the control elements 113 can include a main pressure relief valve that is arranged to return all of the hydraulic oil flow A to the reservoir 111 when a selected maximum pressure is reached within the PFM 102. This helps protect the PFM 102 from pressure spikes and helps protect the single hydraulic pump 105 on the HPU 104. The main pressure relief valve can also help the PFM 102 operate with different hydraulic power sources having minimum performance specifications.

Figure 6:
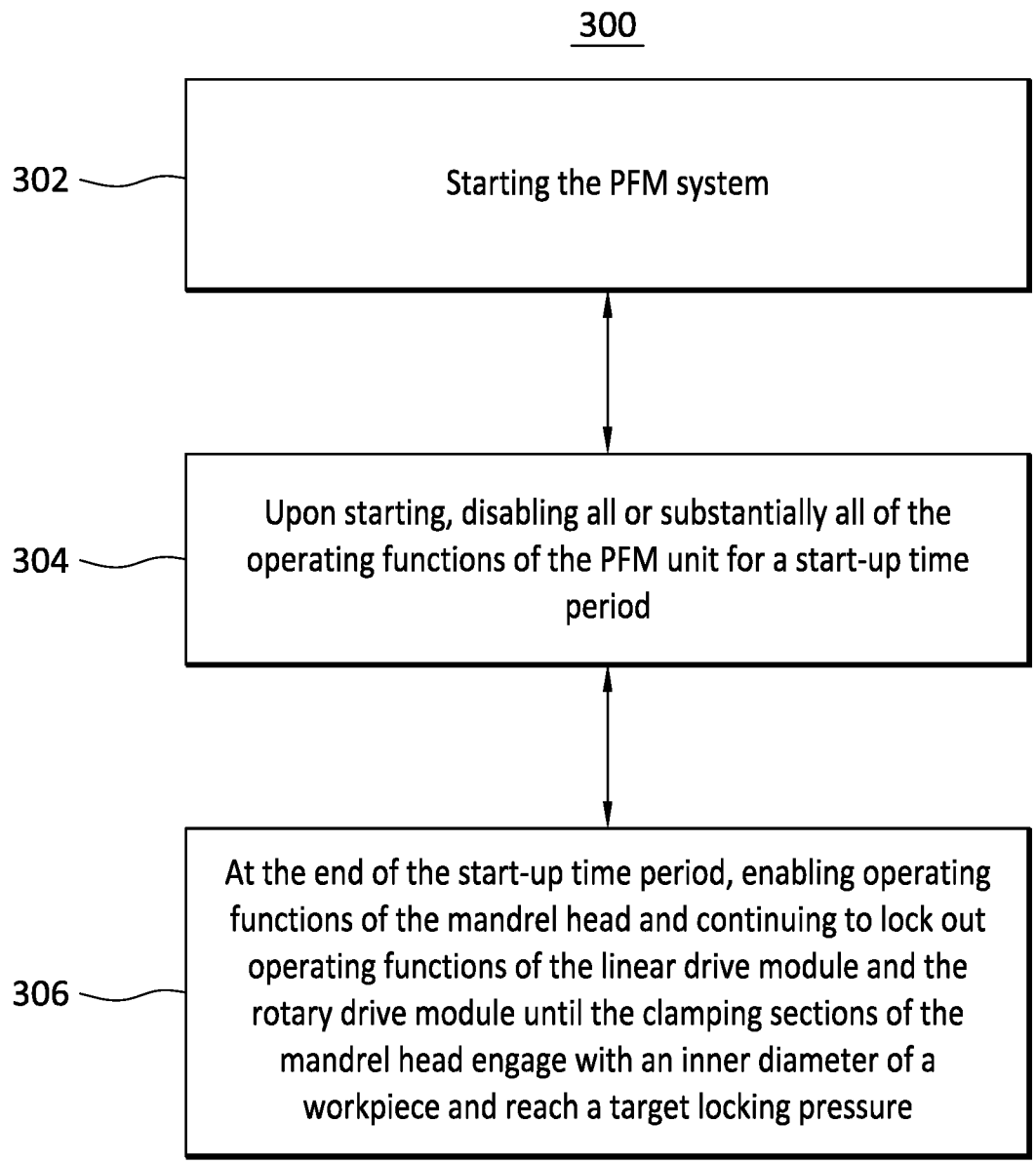
FIG. 6 shows an operational routine of the PFM system of FIG. 1 according to an embodiment.

Referring now to FIG. 6, an application 300 of the system 100 will now be described according to another embodiment. Step 302 can include turning on or starting the system 100. This can include receiving user input specifying the initiation of a machining operation routine by the system 100. Step 304 can include disabling all or substantially all operating functions of the PFM system 100 for a specified time-period upon the starting of the system 100. This can be done automatically by the system 100 and may include the operating module 125 outputting one or more instructions via the I/O module to the hydraulic controller 103 so that hydraulic oil flow to the linear drive system 138, the rotary drive system 186, and the clamping drive system 141 is blocked or prevented. In an embodiment, the operating module 125 can output one or more instructions via the I/O module to the hydraulic controller 103 so that hydraulic oil flow or pressure to the linear drive system 138, the rotary drive system 186, and the mandrel head 128 is lowered below operational limits.

According to a variation, a step 306 includes at the end of the start-up time-period enabling operating functions of the clamping drive system 141 and continuing to lock out operating functions of the linear drive system 138 and the rotary drive system 186 until the clamping sections 204 of the mandrel head 128 are engaged with an inner diameter of a workpiece and reach a target pressure setting. This can include the operating module 125 outputting one or more instructions via the I/O module to the hydraulic controller 103 so that it selectively diverts or directs hydraulic flow to the mandrel head 128 and prevents hydraulic flow to the linear drive system 138 and the rotary drive system 186.

It will be appreciated that various functions of the PFM system 100 may be executed in whole or in part by the computer control system 121, the hydraulic controller 103, the control panel 153, and/or other units. For instance, one or more measuring devices (e.g., pressure sensors) can measure the clamping pressure exerted by the clamping sections 204, and the measuring module 127 may receive data associated with the actual clamping pressure from the measuring devices, which, in turn, can be analyzed or processed by the measuring module 127 and/or the processing module 129. If the actual clamping pressure is less than the target pressure setting, the operating module 125 outputs one or more instructions or signals via the I/O module to the hydraulic controller 103 so that it directs hydraulic flow to or pressurizes hydraulic oil provided to the clamping drive system 141 and prevents hydraulic flow or relieves pressure to the linear drive system 138 and the rotary drive system 186.

If the actual clamping pressure is greater than the target pressure setting, the operating module 125 outputs one or more instructions or signals via the I/O module 123 to the hydraulic controller 103 so that it directs hydraulic flow to or pressurizes the hydraulic oil provided to the clamping drive system 141, the linear drive system 138, and the rotary drive system 186. This application or logic beneficially helps ensure that the PFM 102 remains securely and safely mounted on the workpiece during operation. Optionally, the application can include a step of blocking the release of the clamping sections 204 from the inner diameter of the workpiece until a retracting hydraulic instruction or signal is received from the computer control system 121. In other embodiments, the computer control system 121 and/or the hydraulic controller 103 can be arranged to lock the clamping sections 204 in a clamped position if the PFM 102 experiences a hydraulic and/or electric power loss, enhancing operator safety.

According to a variation, the computer control system 121 can be adapted to shut down the HPU 104 and stop all or some hydraulic flow in the PFM 102. For instance, the computer control system 121 can be configured to prevent the HPU 104 from starting unless the emergency stop control on the control panel 153 is deactivated or pulled out. If the emergency stop control is activated or pushed in during operation of the PFM 102, the computer control system 121 can move or reset all inputs and outputs to a home or neutral position, which, in turn, directs the hydraulic controller 103 to return hydraulic oil back to the reservoir 111. Activation of the emergency stop control may also be arranged to shut down the HPU 104 and stop all hydraulic flow in the PFM 102. According to a variation, all controls or switches of the control panel 153 must be set or moved to their neutral or home positions, before the control elements 113 (e.g., solenoid valves) of the hydraulic controller 103 direct hydraulic oil to the drive systems.

As described above, prioritization of hydraulic oil within the PFM 102 can help protect the PFM system 100 and an operator or individual operating the PFM system 100. In an embodiment, a routine or application of the PFM system 100 can include the operating module 123 outputting one or more instructions or signals via the I/O module to the hydraulic controller 103 so that it directs priority hydraulic oil flow first to the clamping drive system 141 and/or linear drive system 138 until certain operating demands (e.g., pressure, speed, position, etc.) have been met. The operating demands can be real-time operating demands or pre-determined operating demands. If the operating demands of the clamping drive system 141 and/or the linear drive system 138 have not been met, the operating module 125 outputs one or more instructions or signals via the I/O module 125 to the hydraulic controller 103 so that it only directs the priority hydraulic oil flow to the clamping drive system 141 and/or the linear drive system 138. If the operating demands have been met, the operating module 125 outputs one or more instructions or signals via the I/O module 123 to the hydraulic controller 103 so that it directs leftover or non-priority hydraulic oil flow to the rotary drive system 186.

The PFM system 100 can include other safety features. For instance, the jog feed function, the jog rotate function, and the clamping function of the PFM 102 can be configured to activate or work whenever the required supply of hydraulic power is provided to the PFM 100, while the feed function and the drive function of the PFM 102 are configured to only work when one or more conditions are met. For instance, even with a sufficient supply of hydraulic oil to the PFM 102, the feed function and the drive function may be blocked or deactivated until the clamping sections 204 are extended and a target pressure setting is reached, and the chip guards 118, 120 are shut and the door switches 155 (shown in FIG. 4) are closed. If hydraulic pressure in the clamping sections 204 drops below the target pressure setting, the computer control system 121 directs the hydraulic controller 103 to deactivate the feed function and the drive function. The control panel 153 can display a warning (e.g., a red light at a clamp pressure gauge) indicating low clamping pressure to the operator. The computer control system 121 is arranged not to enable the feed function and the drive function until the feed and drive controls on the control panel 153 are moved or reset to neutral or home positions and the hydraulic pressure in the clamping sections 204 is recharged above the target pressure setting. This allows cutting or machining operations on a workpiece to be safely terminated or interrupted before the PFM 102 starts to move relative to or even releases from the workpiece, substantially decreasing the likelihood of damage to the PFM system 100 and injury to an operator.

According to a variation, the feed function and the drive function of the PFM 102 will not work if either of the chip guards 118, 120 are not in a closed position. For instance, if at least one of the chip guards 118, 120 opens or moves out of the closed position while the feed function and/or the drive function are activated, the computer control system 121 can receive a signal from a respective door switch 155, which, in turn, will cause the computer control system 121 to direct the hydraulic controller 103 to stop or deactivate both the feed and drive functions. The computer control system 121 will also provide a warning to an operator via the control panel 153, indicating the chip guard is open or not fully in the closed position. The computer control system 121 is arranged not to enable the feed function and the drive function until the chip guards 118, 120 are shut or moved to the closed position, and the feed and drive controls on the control panel 153 are moved to the neutral or home positions. This greatly deceases the likelihood of injury to the operator by preventing cutting or machining operations without the protection provided by the chip guards 118, 120.

It will be appreciated that many of the elements described in the disclosed embodiments may be implemented as modules. A module is defined here as an isolatable element that performs a defined function and has a defined interface to other elements. The modules described in this disclosure may be implemented in a physical element, hardware, a combination of hardware and software, firmware, or a combination, all of which can be behaviorally equivalent. Modules may be implemented using computer hardware in combination with software routine(s) written in a computer language. It may be possible to implement modules using physical hardware that incorporates discrete or programmable analog and/or digital hardware. Examples of programmable hardware include computers, microcontrollers, microprocessors, application-specific integrated circuits, field programmable gate arrays, and complex programmable logic devices.

As noted above, the automated drive routines or applications may be software embodied on a computer readable medium which when executed by a processor component of a computer device performs a sequence of steps. The application may be a mobile application or application software configured to run on smartphones, tablets computers, and/or other mobile devices.

Moreover, embodiments of the present disclosure may comprise or utilize a special-purpose or general-purpose computer system that includes computer hardware, such as, for example, one or more processors and system memory, as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the disclosure.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Structural features of the PFM 102 will now be described in more detail according to an embodiment. Referring again to FIG. 1, the frame structure 108 of the PFM 102 can be made of any suitable material such as steel or the like. As seen, the frame structure 108 can include a main frame 110 comprising a plate extending above the body 106 and defining a plurality of holes 112, providing lifting points via which the PFM 102 can be lifted and suspended by a boom truck or a crane. In an embodiment, the frame structure 108 includes a plurality of tube members 114 connected to the main frame 110. The tube members 114 can have feet members 116 that are repositionable to adjust the overall height of the tube members 114, which, in turn, adjusts a centerline of the PFM 102. Optionally, one or more of the tube members 114 can be arranged to house or route electrical wiring and or plumbing associated with the PFM 102, protecting the wiring and/or plumbing from the elements. The chip guards 118, 120 can be mounted on a lower portion of the main frame 110 on opposite sides of a cutting head described below.

Figure 7:
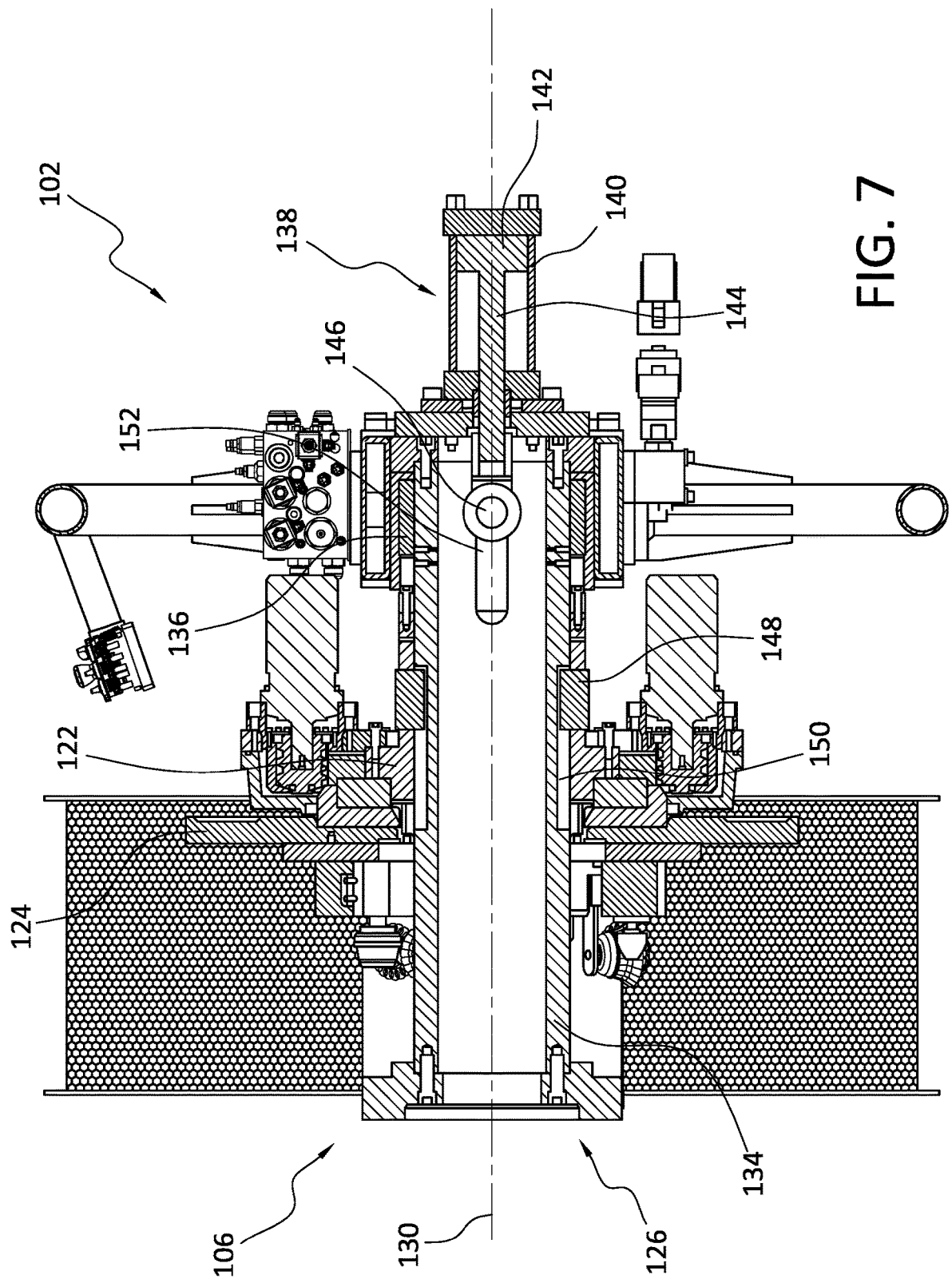
FIG. 7 shows a partial cross section of the PFM of FIG. 1.

FIG. 7 shows a cross section of the PFM 102 with the mandrel head 128 removed for ease of reference. As seen, the mandrel assembly 126 includes a mandrel shaft 134 that extends through a sleeve extension 136, the support sleeve 122, and the cutting head 124. In an embodiment, the sleeve extension 136 can form a portion of the support sleeve 122. The support sleeve 122 and the sleeve extension 136 is a generally cylindrical member sized and configured so that it is generally fixed against rotation relative to the mandrel shaft 134 but can slide or translate relative to the mandrel shaft 134 along the axis 130. The mandrel shaft 134 can be formed of any suitable material such as plated steel ground smooth and can have an oversized diameter, enhancing stability of the PFM 102 during cutting operations.

The cutting head 124 is rotatably mounted to the support sleeve 122 such that the support sleeve 122 and the cutting head 124 move axially together with the sleeve extension 136. The linear drive system 138 is operatively connected to the sleeve extension 136 and arranged to controllably translate the sleeve extension 136 along the axis 130, which, in turn, advances and feeds the cutting head 124 during cutting operations. It will be understood that the linear drive system 138 can have rapid, rapid jog, and slow feed controls. In the illustrated embodiment, the linear drive system 138 comprises a hydraulic cylinder including a cylinder body 140 mounted on a back side of the mandrel shaft 134, a piston 142 arranged to reciprocate in the cylinder body 140, and a piston rod 144 attached to the piston 142 and extending from the cylinder body 140 to a connection between the piston rod 144 and a pin member 146 of the sleeve extension 136. When the piston 142 reciprocates within the cylinder body 140, the piston rod 144 moves the sleeve extension 136 forward and backward on the mandrel shaft 134 along the axis 130 by pushing and pulling on its connection with the sleeve extension 136.

According to a variation, the body 106 includes one or more anti-rotation features. For instance, the sleeve extension 136 (forming part of the support sleeve 122) can include an anti-rotation key 148 received in a keyway 150 on the mandrel shaft 134 and the pin member 146 of the sleeve extension 136 can extend through and slide along a slot 152 defined in the mandrel shaft 134, helping to prevent the support sleeve 122 and the sleeve extension 136 from rotating on the mandrel shaft 134. In addition to providing anti-rotation benefits, the keyway 150 and/or the slot 152 in the mandrel shaft 134 can at least in part define a feed limit or a distance through which the cutting head 124 can move along a length of the workpiece from the end surface during cutting operations. For instance, the keyway 150 and/or the slot 152 in the mandrel shaft 134 can be sized and configured such that the cutting head 124 can advance up to about 6 inches, about 6.5 inches, about 7 inches, or about 7.5 inches along a length of the workpiece from its end surface. This beneficially allows the PFM 102 to perform counter-boring operations along an inner diameter of the workpiece that conventional PFMs cannot complete because the counter-bore cut frequently goes up to 6 inches into the workpiece from its end surface.

Figure 8:
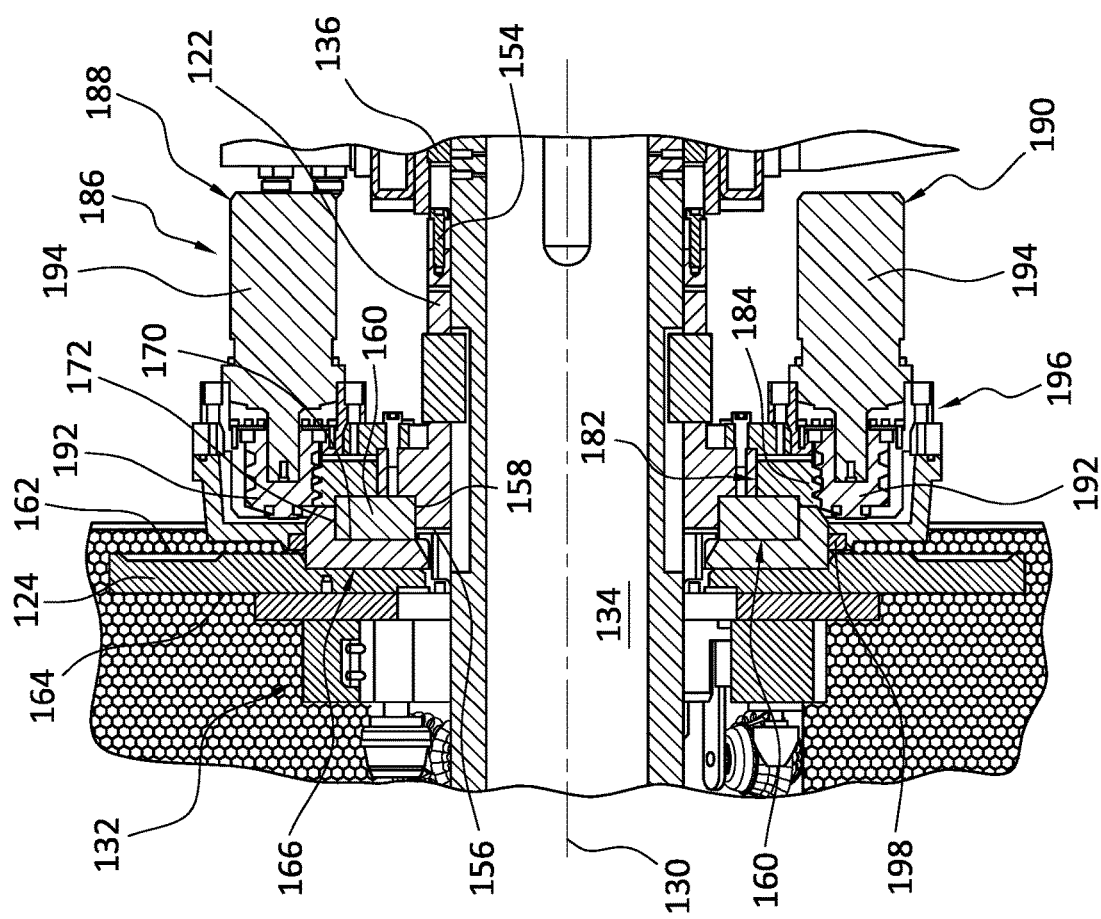
FIG. 8 shows a detail cross section of the PFM of FIG. 1.

Referring to FIG. 8, the support sleeve 122 can comprise a cylindrical body carried on the mandrel shaft 134 with a back side 154 connected to the sleeve extension 136 and a front side 156 defining an annular shoulder 158. A bearing assembly 160 rotatably mounts the cutting head 124 to the support sleeve 122. In an embodiment, the bearing assembly 160 includes an inner race defining an opening through which the mandrel shaft 134 and the support sleeve 122 extend and an outer race that extends about and receives the inner race. The inner radial surface of the inner race can be attached to the annular shoulder 158 of the support sleeve 122. A plurality of bearing elements are disposed between the inner and outer races. The bearing assembly 160 is arranged to provide rigidity, reduce friction, and facilitate smoother and easier rotation of the cutting head 124.

The bearing assembly 160 also transfers axial and/or radial loads from the cutting head 124 to the support sleeve 122. For instance, the bearing assembly 160 can comprise a single dual row cross roller bearing assembly adapted to handle both axial and radial loads. The use of a single bearing assembly to handle axial and radial loads beneficially allows the weight and/or size of the components complementing the bearing assembly 160 (i.e., the support sleeve 122) to be reduced, which, in turn, reduces the overall weight and envelope of the PFM 102 such that it can be more easily transported and employed in rugged field environments.

The cutting head 124 can have any suitable configuration but is shown comprising a circular member having a back side 162, which faces the front side 156 of the support sleeve 122, and a front side 134 disposed opposite the back side 162. The tool modules 132 are removably attached to the front side 134 of the cutting head 124. The cutting head 124 is connected to the outer race of the bearing assembly 160 via an intermediate member 166 and the cutting head 124 such that rotation of the outer race about the axis 130 rotates the intermediate member 166 about the axis 130, which, in turn, rotates the cutting head 124 and tool modules 132 about the axis 130. The cutting head 124 can be made from any suitable material such as alloy steel, reducing the weight of the cutting head 124 and helping to reduce vibration waves during cutting operations.

Figure 9A:
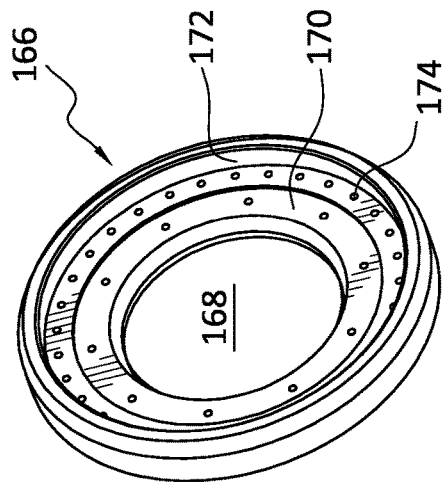
FIG. 9A shows a back-perspective view of the intermediate member of FIG. 7.
Figure 9B:
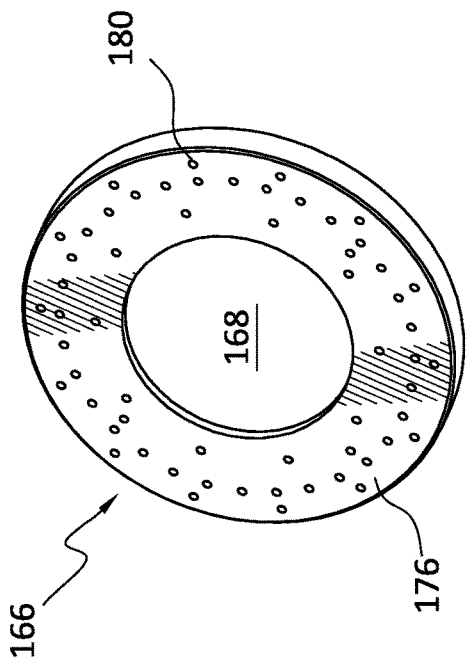
FIG. 9B shows a front perspective view of the intermediate member of FIG. 7.

Referring to FIGS. 9A and 9B, the intermediate member 166 can have any suitable configuration but is shown defining an opening 168 through which the mandrel shaft 134 extends and a back side 170 which faces the front side 156 of the support sleeve 122 and defines an outer annular shoulder 172. The outer race of the bearing assembly 160 is positioned against the outer annular shoulder 172 and attached to the back side 170 of the intermediate member 166. In an embodiment, the back side 170 can define a plurality of apertures 174 for receiving a plurality of fasteners for fastening the bearing assembly 160 to the back side 170 of the intermediate member 166. A front side 176 is disposed opposite the back side 170. The back side 162 of the cutting head 124 is attachable to the front side 176 of the intermediate member 166.

The intermediate member 166 can be made of a cast iron material or any another suitable material. For instance, the intermediate member 166 can be made from a Dura-Bar G2 material or another material having vibration dampening characteristics, helping to reduce vibration waves with the PFM 102 during cutting operations.

According to an embodiment, the cutting head 124 is modular in that it can be selected from a plurality of cutting heads 124, 124A, 124B (shown in FIGS. 10A-10C) with varying dimensions and/or cutting features, and yet have common connecting features 178 that permit any one of the cutting heads 124, 124A, 124B to be attached to and used on the PFM 102. As seen in FIGS. 9B and 10A-10C, the front side 176 of the intermediate member 166 can define a plurality of apertures 180 for receiving a plurality of fasteners for fastening the cutting head 124 or another cutting head 124A, 124B to the front side 176 of the intermediate member 166. It will be appreciated that the cutting heads 124, 124A, 124B can include the common connecting features 178 comprising common apertures corresponding to the apertures 180 of the intermediate member 166. The intermediate member 166 can thus provide a universal mount for the different cutting heads, advantageously allowing the PFM 102 to operate using cutting heads that are interchangeable for repair or reconfiguration.

For instance, the cutting head 124 can be sized and configured to machine workpieces having diameters between 24 inches and 36 inches when attached to the intermediate member 166. If a project requires beveling or facing a workpiece having a diameter of 48 inches, the cutting head 124 can be removed and replaced with another cutting head 124A having a larger diameter to change the configuration of the PFM 102 such that it can handle the larger workpiece. The PFM system 100, a single system, can thus be configured and/or reconfigured to machine workpieces having a wide range of diameters (e.g., from 24 inches and 48 inches). This is advantageous over known land-based PFM systems that would require between 3 and 5 different PFMs to machine the same range of workpieces.

Referring again to FIG. 8, a gear ring 182 is connected to the bearing assembly 160. The gear ring 182 can comprise a separate ring member attached to a back side of the outer race of the bearing assembly 160. The gear ring 182 can be integral to the bearing assembly 160. The gear ring 182 includes a plurality of teeth 184 formed on an outer radial surface of the gear ring 182. The teeth 184 can be spur teeth, helical teeth, or any other suitable type of teeth. While the teeth 184 are described as being on the outer radial surface, it will be appreciated that the teeth 184 can be formed on the inner radial side, front side, back side, or any other surface suitable to cooperate with the gear members described below. The gear ring 182 is operatively connected to a rotary drive system 186 such that the rotary drive system 186 can drive and control rotation of the cutting head 124 during operation of the PFM system 100.

The rotary drive system 186 can comprise a dual-motor system. For instance, it can include first and second drive assemblies 188, 190 cooperating with the gear ring 182 to drive and control rotation of the cutting head. The first and second drive assemblies 188, 190 can be positioned behind the cutting head 124. Each of the drive assemblies 188, 190 can include a drive gear 192 defining teeth that mesh or cooperate with the teeth 184 on the gear ring 182 and a motor 194 arranged to drive the drive gear 192. When one or more of the drive gears 182 are driven by one or more of the motors 194, the gearing ring 182 and the cutting head 124 rotate about the axis 130. The motors 194 can be hydraulically driven. It will be appreciated that the cutting head 124 can be driven by one or both motors 194. The second drive assembly 190 can also be arranged to help stabilize the cutting head 124 as it rotates about the axis 130 and transmits torque.

The rotary drive system 186 includes a protective housing 196 arranged to conceal and/or protect the gear connections between the rotary drive system 186 and the gear ring 182. The protective housing 196 can have any suitable configuration but is shown having a bell-shape and a two-part construction comprising a front piece and a back piece fastened to the front piece. In an embodiment, the front piece of the protective housing 196 can be formed of aluminum casting. A sealing member 198 can be positioned and arranged to form a seal between the front piece of the protective housing 196 and the intermediate member 166, which, in turn, can help seal off the gear connections. The rotary drive system 186 can include lubrication comprising a grease-based system. This can advantageously reduce maintenance and improve reliability of the rotary drive system 186 compared to known drive systems using oil bath systems in a field environment.

Referring to FIG. 11, the mandrel head 128 can be connected to a front portion of the mandrel shaft 134. In an embodiment, the mandrel head 128 is modular similar to the cutting head 124 such that the mandrel head 128 can be removable and interchangeable with different mandrel heads on the mandrel shaft 134 for use in different applications. For instance, the mandrel head 128 can be removable and interchangeable with a short perch mandrel head.

The mandrel head 128 can include a set of hydraulically driven clamping sections 204 with mounting pads 206. The clamping drive system 141 can operate the clamping sections 204 to selectively expand radially outwardly such that the mounting pads 206 apply a clamping pressure to an inner diameter of the workpiece, mounting the PFM 102 on the workpiece. The clamping pressure can be adjustable. For instance, the clamping pressure can be adjustable between about 500 psi and about 2000 psi. This beneficially allows for less clamping pressure if needed (e.g., in thinner wall beveling applications), increasing versatility of the PFM 102.

A pair of guide wheel assemblies 208 are attached to the mandrel head 128 and arranged to help align and/or center the mandrel head 128 on the workpiece. In an embodiment, the guide wheel assemblies 208 are adjustable and arranged to help track the inner diameter of the workpiece.

FIG. 12 illustrates a PFM system 400 according to yet another embodiment including a PFM 402. The PFM 402 can include the same or similar features as those described in relation to the PFM 102. For instance, the PFM 402 may include a hydraulic controller like hydraulic controller 103 arranged to receive and distribute hydraulic power from an HPU or other hydraulic power source via a single hydraulic circuit. The PFM 402 can include a body 406 and a frame structure 408 arranged to support and protect the body 406. The frame structure 408 can include a main frame 410 comprising a plate extending above the body 406 and defining a plurality of holes 412, providing lifting points via which the PFM 402 can be lifted and suspended by a boom truck or a crane. In an embodiment, the frame structure 408 includes a plurality of tube members 414 connected to the main frame 410. The tube members 414 can have feet members 416 that are repositionable to adjust the overall height of the tube members 414, which, in turn, adjusts a centerline of the PFM 402. The tube members 414 form a protective structure 415 over a linear drive system 438 of the PFM 402.

Chip guards 418, 420 can be slidably mounted to the body 406 via a rail system 407 on opposite side of a cutting head 424. The chip guards 418, 420 can be moved along the rail system 407 between a closed position in which the chip guards 418, 420 limit or prevent stray debris or chips from flying away from a workpiece and toward an operator during machining or cutting operations, and an open position. Like the previous embodiments, the chip guards 418, 420 can include at least one safety feature that disables cutting or machining operations when at least one of the chip guards 418, 420 are in the open position. It will be appreciated that the rail system 407 can reduce the overall profile of the PFM 402 as the chip guards move along an axis 430 of the system 400 rather than opening radially outward relative to the axis 430 and the cutting head 424.

The body 406 includes a cutting head 424 rotatably mounted on the body 406 and carrying one or more tool modules 432. A rotary drive system is operably connected to the cutting head 424 and arranged to controllably drive rotation of the cutting head 424 about the axis 430. A linear drive system 438 is operatively connected to the cutting head 424 and arranged to controllably translate the cutting head 424 along the axis 430 toward and away from the workpiece. Optionally, the cutting head 424 can be modular such that the cutting head 424 can be removable and interchangeable with different cutting heads on the PFM 402 for use in different applications.

A mandrel assembly 426 of the PFM 102 includes a mandrel head 428 arranged to selectively mount the PFM 402 to a workpiece. A clamping drive system 441 is operatively connected to the mandrel assembly 426 and arranged to radially expand and contract one or more clamping sections 404 of the mandrel assembly 426 to mount and release the PFM 402 from the workpiece. Like the cutting head 424, the mandrel head 428 can be modular. The one or more clamping sections 407 of the mandrel head 428 are hydraulically driven and include mounting pads 419 arranged to engage with the inner diameter of a workpiece or pipe. At least one guide wheel assembly 409 is attached to the mandrel head 428 and arranged to help align and/or center the mandrel head 428 on the workpiece. In an embodiment, the guide wheel assembly 409 includes a plurality of trapezoidal structures 411 carrying a plurality of wheels 413 circumferentially distributed about the guide wheel assembly 409, helping to stabilize the workpiece on the mandrel head 428. A tracking arm 417 is attached to the mandrel head 428 and arranged to help track the inner diameter of the workpiece. The tracking arm 417 can be adjustable.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

The invention claimed is:

1. A pipe facing machine system comprising:
a pipe facing machine including:
a body defining an axis;
a mandrel assembly mounted to the body and arranged to clamp the pipe facing machine on a workpiece;
a cutting head mounted on the body and arranged to rotate and translate relative to the axis;
a plurality of drive systems comprising a clamping drive system arranged to drive clamping of the mandrel assembly on the workpiece, a rotary drive system arranged to drive rotation of the cutting head about the axis, and a linear drive system arranged to drive translation of the cutting head along the axis;
a hydraulic controller connected to the body, the hydraulic controller comprising a plurality of control elements in communication with a control system configured to direct and regulate hydraulic oil flow to controllably drive operation of the drive systems, and the hydraulic controller including a manifold hydraulically connecting the rotary drive system, the linear drive system, and the clamping drive system;
and a hydraulic power unit having a single fixed gear hydraulic pump arranged to supply a hydraulic oil flow to the hydraulic controller via a single hydraulic circuit having only a single supply line and a single return hydraulically connected to the single fixed gear hydraulic pump,
wherein the control system includes memory having instructions stored thereon which, when executed, cause the hydraulic controller to direct a priority hydraulic oil flow from the hydraulic oil flow to one or more priority hydraulic functions of at least the clamping drive system to drive clamping to the workpiece, and then to direct a remaining hydraulic flow from the hydraulic oil flow to one or more non-priority hydraulic functions of at least the rotary drive system, wherein the remaining hydraulic flow is greater than the priority flow.

2. The pipe facing machine system of claim 1, wherein the hydraulic controller is arranged to direct the priority hydraulic oil flow from the hydraulic oil flow to the one or more priority hydraulic functions if the clamping drive system is activated, and then direct the remaining hydraulic flow to the one or more non-priority hydraulic functions.

3. The pipe facing machine system of claim 1, wherein the control elements return the hydraulic oil flow to the hydraulic power unit via the single hydraulic circuit when a selected maximum pressure is reached within the pipe facing machine.

4. The pipe facing machine system of claim 1, wherein the one or more priority hydraulic functions comprise a clamping function in which the clamping drive system drives the clamping of the mandrel assembly on the workpiece, a feed function in which the linear drive system drives the translation of the cutting head along the axis, and a jog rotate function in which the rotary drive system drives rotation of the cutting head for positioning tool modules carried on the cutting head.

5. A pipe facing machine system comprising:
a pipe facing machine including:
a body defining an axis;
a cutting head mounted on the body and arranged to rotate and translate relative to the axis;
a plurality of drive systems comprising a clamping drive system arranged to drive clamping of the pipe facing machine on a workpiece, a rotary drive system arranged to drive rotation of the cutting head about the axis, and a linear drive system arranged to drive translation of the cutting head along the axis;
a hydraulic controller connected to the body, the hydraulic controller comprising a plurality of control elements in communication with a control system configured to direct and regulate hydraulic oil flow to controllably drive operation of the drive systems, and the hydraulic controller including a manifold hydraulically connecting the rotary drive system, the linear drive system, and the clamping drive system; and
a hydraulic power unit having a single fixed gear hydraulic pump arranged to supply a hydraulic oil flow to the hydraulic controller via a single hydraulic circuit having only a single supply line and a single return hydraulically connected to the single fixed gear hydraulic pump,
wherein the control system includes memory having instructions stored thereon which, when executed, cause the hydraulic controller to direct a priority hydraulic oil flow from the hydraulic oil flow to one or more priority hydraulic functions of at least the clamping drive system to drive clamping to the workpiece, and then to direct a remaining hydraulic flow from the hydraulic oil flow to one or more non-priority hydraulic functions of at least the rotary drive system, wherein the remaining hydraulic flow is greater than the priority flow.

* * * * *